Figure 1:
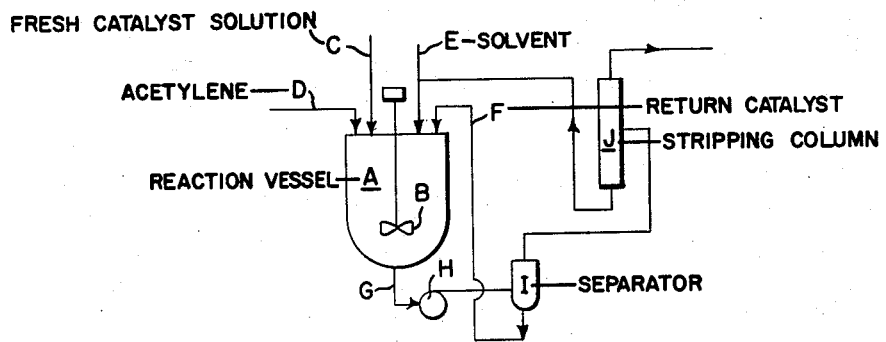

April 26, 1960    E. P. GOFFINET, JR    2,934,576
IMPROVED PROCESS FOR THE MANUFACTURE OF
MONOVINYLACETYLENE FROM ACETYLENE
Filed May 16, 1958

INVENTOR
EDWARD PETER GOFFINET, JR.

BY *Walter H. Steinbaugh*

ATTORNEY

United States Patent Office 2,934,576
Patented Apr. 26, 1960

2,934,576

IMPROVED PROCESS FOR THE MANUFACTURE OF MONOVINYLACETYLENE FROM ACETYLENE

Edward Peter Goffinet, Jr., Louisville, Ky., assignor to E. I. du Pont de Nemours and Company, Wilmington, Del., a corporation of Delaware Application May 16, 1958, Serial No. 735,731

2 Claims. (Cl. 260—678)

This invention is directed to the manufacture, from acetylene, of monovinylacetylene, an intermediate in the manufacture of neoprene synthetic rubber (polychloroprene). More particularly, it relates to the continuous manufacture of monovinylacetylene using cuprous chloride catalyst consisting of two liquid phases, and, to an improved method for using these catalysts.

When an aqueous solution of cuprous chloride and ammonium chloride is saturated with acetylene according to the original method of Nieuwland, U.S. 1,811,959, monovinylacetylene is first formed but is largely converted to divinylacetylene and higher polymers of acetylene. In order to make monovinylacetylene more efficiently, acetylene is passed through the catalyst at such a rate that only a part of the acetylene (about 10%) reacts and the monovinylacetylene formed is swept out of the catalyst by the acetylene stream, as in U.S. 2,048,838. The monovinylacetylene is then separated from the effluent gas by condensation and the acetylene amounting to about 90% of that passed into the catalyst, is recycled. In this way, the yield of monovinylacetylene, based on the acetylene consumed, may be made high but the conversion per pass is low and the repeated treatment of large volumes of acetylene to recover the monovinylacetylene contained is rather costly. Significant improvements in the relationship between yield and conversion have recently been made by using a column of sieve plates (see U.S. Patent 2,759,985) as the reactor and by using a two-phase catalyst system formed by suspending in the aqueous catalyst, a hydrocarbon (i.e., kerosene, toluene, etc.), a halohydrocarbon (i.e., tetrachloroethylene, otho-dichlorobenzene, etc.) or certain monoalkyl ethers of diethylene glycol (i.e., diethylene glycol monobutyl ether). Another approach which has led to important improvements is the use of certain anhydrous carboxylic acid amides (i.e., dimethyl formamide) instead of water as the solvent. Additional improvement is obtained by the use of another two-phase catalyst system formed by suspending in such catalysts another liquid which is substantially immiscible therewith and is a solvent for the acetylenes.

All these improvements, however, fall far short of the ultimate goal of a process giving complete conversion without loss of yield due to the formation of other polymers of acetylene.

It has been discovered that an important and unexpected improvement in yield at high conversion is obtained by the process of the present invention which uses in an entirely different way and significantly expands the scope of the two-phase catalyst systems utilized heretofore.

It is an object of the present invention to provide a process for the manufacture of monovinylacetylene which process gives a significant increase in yield of monovinylacetylene and which process significantly reduces the polymer by-product formation factor in known prior art processes. These and other objects will become apparent in the following description and claims.

More specifically, the present invention is directed to a process of making monovinylacetylene by continuously passing acetylene into an agitated catalyst containing two liquid phases, in a reaction vessel, one phase being a solution of cuprous chloride and the other phase being an inert solvent for the monovinylacetylene immiscible with the cuprous chloride solution, the improvement being in totally absorbing the acetylene in the catalyst and removing the polymers thus formed by continuously withdrawing a portion of the mixed liquid catalyst from the reaction vessel, allowing it to stratify, returning the phase rich in cuprous chloride to the reactor, removing the reaction products from the second phase, separating pure monovinylacetylene therefrom, and returning the solvent to the reaction vessel.

This novel process differs radically and unexpectedly from those used or contemplated by the prior art in that (1) the acetylene is completely absorbed in the reaction vessel rather than being used as a carrier gas for the monovinylacetylene, and (2) the monovinylacetylene is permanently removed from the reaction vessel by removing the solvent phase in which it dissolved.

In previous processes where a two-phase catalyst is used and a stream of it is removed for the separation of tar, and the cuprous chloride phase is then returned to the reactor, high rates of flow of acetylene are required to give good yields of monovinylacetylene and to remove it from the catalyst as formed, and very low rates of removal of the catalyst are all that are required to prevent the accumulation of tar in the system. As a result of both these conditions, the amount of monovinylacetylene withdrawn from the reactor is negligible and no provision is made for its separation.

The present invention may be applied to any cuprous chloride catalyst consisting of two liquid phases, one of which contains little or no cuprous chloride but is an inert solvent for monovinylacetylene. When water is the solvent for the cuprous chloride (along with a water-soluble chloride), suitable immiscible second phases are hydrocarbons and halogenated hydrocarbons, ethers, higher alcohols, ketones, and esters. Solvents miscible with water, such as the monobutylether of diethyleneglycol are suitable when they are immiscible with the aqueous cuprous chloride solution and dissolve little or no cuprous chloride therefrom. When the solvent for the cuprous chloride is a carboxylic acid amide, suitable second phases are aliphatic and hydroaromatic hydrocarbons, as well as halogenated and aromatic hydrocarbons which fulfill the general requirements above.

The requirement that the solvent should be inert means that it should not be polymerizable or reactive with the other ingredients, including the cuprous chloride. The solvent used in the second phase is not limited as to volatility. Thus those boiling between the boiling points of monovinylacetylene (5° C.) and divinylacetylene (84° C.) and preferably between about 20 and about 70° C., form one preferred class, exemplified by methylene dichloride (B.P. 40° C.) n-pentane (B.P. 37° C.), and n-hexane (B.P. 69° C.) used in Example 7. Thus these solvents may be separated by distillation from both the monovinylacetylene and the divinylacetylene. Another preferred class has boiling points above about 200° C., exemplified by tetrahydronaphthalene (B.P. 205° C.) in Examples 3, 4 and 5. These allow the mono- and divinylacetylenes to be removed without distilling the whole mass.

The ratio of the cuprous chloride phase to the monovinylacetylene solvent phase is preferably between 1:1 and 1:5 by volume, although both larger and smaller ratios are also effective according to the present invention. The temperature and pressure of operation are also not critical and may be anywhere within the ranges already given generally for monovinylacetylene manufacture, except that they obviously should be such as to keep the solvent liquid. Preferred temperatures are usually between 40 and 90° C. and the preferred pressures between one and three atmospheres. Correspondingly higher total pressures may be used when the acetylene supplied to the reactor is diluted with inert gases; e.g., with a 10% acetylene feed, pressures up to 30 atmospheres may be utilized. The chlorides used to dissolve the cuprous chloride in the water or other solvent have been fully discussed in the prior art. Potassium chloride is generally preferred for water and monomethylamine and dimethylamine hydrochlorides for the carboxylic amides. Their molecular ratios to the cuprous chloride (as $Cu_2Cl_2$) are likewise those used before, and are usually between 1:1 and 1:3. The concentration of the chlorides in the phase in which they are soluble should preferably be somewhat below that required for saturation at the temperature used. The catalyst should be well agitated to disperse one liquid phase in the other and to dissolve the acetylene rapidly. The phase containing the cuprous chloride may be either the internal or the external phase. Dispersing agents are sometimes used to assist the dispersion but they should not be such as to interfere with the separation of the two phases, prior to removal of the solvent phase, when removed from the zone of agitation.

Representative examples illustrating the present invention are as follows:

Example 1

Five cc. of a catalyst consisting of a solution of 65 parts by weight of KCl and $Cu_2Cl_2$ in a molar ratio of 2:1 in 35 parts by weight of water and 5 cc. diethylene glycol monobutylether were introduced into a 35 cc. reaction flask from which the air had been replaced by acetylene. This reaction flask was provided with an inlet for introducing acetylene, a burette for adding measured volumes of liquids, a magnetically operated stirrer, and a rubber-covered inlet through which a small hypodermic needle could be introduced for withdrawing samples. The reaction flask was kept at 65° C. in a constant temperature bath. During the run, acetylene was introduced at 1 atm. pressure as it was absorbed by the agitated catalyst. At the end of 30 minutes, agitation was stopped and the catalyst mixture was allowed to separate into two layers. A small sample of the upper (ether) layer was removed and analyzed chromatographically. The analysis indicated that it contained acetylene and monovinylacetylene but no divinylacetylene. The ratio of acetylene to monovinylacetylene showed that 78% of the acetylene introduced had been converted to the latter. Since no detectable divinylacetylene was formed, the yield of monovinylacetylene, based on the acetylene converted was substantially 100%.

When the reaction was run for a total of 60 minutes, with the acetylene pressure maintained at one atmosphere by introducing fresh gas as needed, divinylacetylene was formed, the yield of monovinylacetylene falling to 95%, the conversion being 84%. After 165 minutes the yield was 80% and the conversion 96%.

For comparison, the same catalyst mixture in an agitated horizontal reactor in which an excess of the acetylene was used to sweep the products from the catalyst, the yield was 93% at a conversion of 10%.

Example 2

Example 1 was repeated, except that the catalyst mixture consisted of 5 cc. 70 parts by weight of monomethylamine hydrochloride and cuprous chloride in a molar ratio of 1.5:1 and 30 parts by weight of anhydrous dimethyl formamide and 5 cc. of kerosene and the temperature was 60° C. In 30 minutes, the conversion was 83% and the yield was substantially 100%. In 45 minutes the conversion was 95% and the yield 70%.

Example 3

Example 2 was repeated, using tetrahydronaphthalene instead of kerosene and a ratio of amine hydrochloride to cuprous chloride of 1.75:1. In 15 minutes, the yield was 92% and the conversion 73%.

Example 4

Example 3 was repeated, using 8 volumes of tetrahydronaphthalene to 2 volumes of the cuprous chloride solution and a temperature of 50° C. After 45 minutes the yield was still substantially 100% and the conversion 84%.

Example 5

Example 4 was repeated at 60° C., and operated semicontinuously by removing 10 volumes of the tetrahydronaphthalene solution at the end of each half hour and replacing it by an equal volume of fresh solvent. The yield was between 80 and 95% and the conversion between 82 and 90%.

Example 6

The catalyst mixture of Example 2 was used except that the ratio of kerosene to cuprous chloride solution was 5:1 by volume. The operation was made continuous by using the representative apparatus of the accompanying drawing.

In Figure 1, a reaction vessel A is provided with a stirrer B, and with several inlets, C for fresh catalyst solution, D for acetylene, E for solvent, and F for returned catalyst. The reaction vessel is also provided with an outlet G, connected through a pump H to a separator I, in which the catalyst mixture from the reaction vessel A separates into an upper layer of kerosene containing the reaction products, and a lower layer of dimethylformamide containing dissolved cuprous chloride and methylamine hydrochloride. The lower layer is returned to the reaction vessel through F. The upper layer is kept for examination and analysis in experimental runs but in actual operation passes to a stripping column J in which the monovinylacetylene and acetylene and other acetylene polymers, if present, are removed and the solvent is returned to the reaction vessel through E. The acetylene, monovinylacetylene, and divinylacetylene are then separated from each other by fractional distillation and condensation. Not shown in the drawing are auxiliary equipment such as a drying column and regulating devices for the acetylene supplied through D, a thermostatically controlled bath for A, and rotameters, thermometers, and pressure gauges for determining conditions at various locations.

The catalyst mixture in the reaction vessel A was agitated by the stirrer to give a uniform dispersion and the pump was run so as to remove 4% of the volume of the solvent mixture in the reaction vessel per minute and acetylene was introduced at the rate 0.43 gram per minute per liter of total catalyst (both phases). The conversion at this rate was 94% and the yield between 73 and 81%. When the rate of solvent circulation was raised to 8.4% per minute, the conversion was 84% and the yield was substantially 100%. Fresh solvent and fresh catalyst were added as needed during the runs through E and C, respectively, to make up for losses.

Example 7

Figure 2:
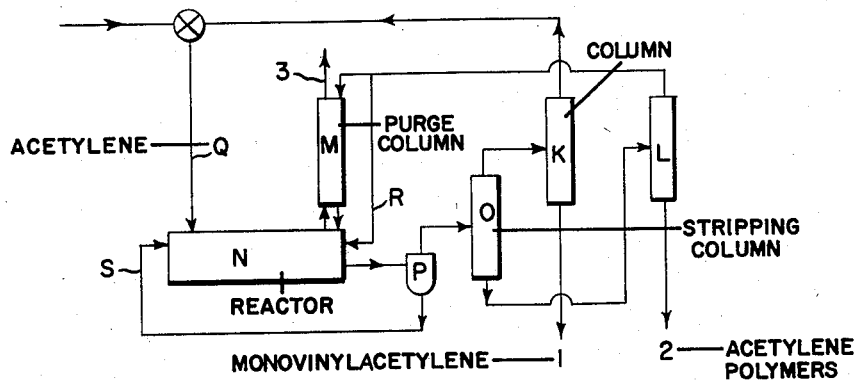

The process of Example 6 was operated at 50° C. and at 50 lbs. per sq. in. pressure, using hexane as solvent and the apparatus shown in Fig. 2, wherein the reactor N is a horizontal cylinder agitated by blades rotated on a horizontal central shaft. The reaction mass from N passes to a separator P in which it separates into an upper layer of hexane containing the reaction products and a lower layer of dimethyl formamide containing the dissolved cuprous chloride and methylamine hydrochloride. The lower layer is returned to the reactor through S. The upper layer passes to the stripping column O in which monovinylacetylene and acetylene are removed from the hexane. The mixture of acetylene and monovinylacetylene from the stripping column O is separated in column K, from which acetylene is recycled through Q and pure monovinylacetylene is recovered as stream 1. The solution of higher polymers in hexane from O passes to still L in which most of the hexane is removed and returned (after condensation), partly to the reactor directly through R and partly through a purge column M, through which undissolved gases pass and in which the hexane absorbs the small amount of acetylene which is present if there is a relatively large amount of inert gas in the acetylene supplied. The purged gas leaves M as stream 3. The still L is operated so that enough hexane remains with the residual higher acetylene polymers (stream 2) to make safe their handling and utilization or disposal. Makeup hexane is added at R in amount equal to that removed in stream 2.

The process of the present invention is well suited to using acetylene containing other gas or even a gas mixture in which the acetylene is present in minor amount, such as the mixtures obtained by cracking or partial oxidation of hydrocarbon at high temperatures. The acetylene is largely or completely absorbed by the catalyst mixture, converted to monovinylacetylene, and removed by the solvent. The unreactive part of the gas is purged from the reaction vessel. Small amounts of acetylene or monovinylacetylene which it may contain may be absorbed and returned to the reactor by contacting the effluent gas with the solvent being introduced into the reactor, as described in Example 7.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of making monovinylacetylene by continuously passing acetylene into an agitated catalyst containing two liquid phases in a reaction vessel, one phase being a solution of cuprous chloride and the other phase being an inert solvent for the monovinylacetylene, said solvent being immiscible with the said cuprous chloride solution and said solvent being taken from the group consisting of hydrocarbons, halogenated hydrocarbons, ethers, higher alcohols, higher ketones, and, higher esters, the improvement which comprises totally absorbing said acetylene in said catalyst, the pressure and temperature being such as to maintain said solvent as a liquid, followed by removing the polymers formed by continuously withdrawing a portion of the resulting mixed liquid catalyst from the reaction vessel, stratifying said withdrawn portion, returning the phase rich in cuprous chloride to the reactor followed by removing the reaction products from the remaining solvent phase and separating pure monovinylacetylene from said second phase and returning the solvent to the reaction vessel.

2. In the process of making monovinylacetylene by continuously passing acetylene into an agitated catalyst containing two liquid phases in a reaction vessel, one phase being a solution of cuprous chloride and the other phase being an inert solvent for the monovinylacetylene, said solvent being immiscible with said cuprous chloride solution and said solvent being taken from the group consisting of hydrocarbons, halogenated hydrocarbons, ethers, higher alcohols, higher ketones, and, higher esters, the improvement which comprises totally absorbing said acetylene in said catalyst, at a temperature within the range of 40 to 90° C. and at a pressure of from 1 to 3 atmospheres, the ratio of said cuprous chloride to said inert monovinylacetylene solvent being within the range of 1:1 to 1:5 by volume, followed by removing the polymers formed by continuously withdrawing a portion of the resulting mixed liquid catalyst from the reaction vessel, stratifying said withdrawn portion, returning the phase rich in cuprous chloride to the reactor followed by removing the reaction products from the remaining solvent phase and separating pure monovinylacetylene from said second phase and returning the solvent to the reaction vessel.

References Cited in the file of this patent

UNITED STATES PATENTS

| | | |
|---|---|---|
| 2,191,088 | Stadler et al. | Feb. 20, 1940 |
| 2,566,136 | Morrell | Aug. 28, 1951 |